United States Patent [19]

Mannessen

[11] Patent Number: 4,483,302

[45] Date of Patent: Nov. 20, 1984

[54] COMBUSTION ENGINE COMPRISING A VAPORIZER PRESSURE REGULATOR

[76] Inventor: Johannes Mannessen, Prof. Lorentzlaan 193, 3707 HH Zeist, Netherlands

[21] Appl. No.: 460,437

[22] Filed: Jan. 24, 1983

[30] Foreign Application Priority Data

Sep. 29, 1982 [EP] European Pat. Off. ......... 82201214.2

[51] Int. Cl.³ ..................... F02B 43/00; F02M 21/04
[52] U.S. Cl. ................................. 123/527; 123/529; 261/DIG. 68; 48/184
[58] Field of Search .......... 123/529, 527, 525; 137/505, 505.13; 48/184; 261/DIG. 68

[56] References Cited

U.S. PATENT DOCUMENTS 2,896,599 7/1959 Ensign ................... 123/527
2,972,988 2/1961 Ranck ................... 123/527

FOREIGN PATENT DOCUMENTS 146044 11/1981 Japan ................... 123/527
847752 9/1960 United Kingdom .......... 48/184

Primary Examiner—Ethel R. Cross
Attorney, Agent, or Firm—Nilsson, Robbins, Dalgarn, Berliner, Carson & Wurst

[57] ABSTRACT

A combustion engine includes an inlet duct including a control valve. A vaporizer-pressure regulator for use with the combustion engine has a first space divided into two parts by a diaphragm contained in the space, the diaphragm actuating a first shut-off valve co-operating with a gas supply orifice of the first space, while the part of the space in which the gas supply orifice opens out is connected through a connecting duct with a second space comprising a member affecting the gas pressure, the space communicating with the inlet duct of the combustion engine, whereby that part of the first space which is located on the side of the diaphragm actuating the first shut-off valve remote from the first shut-off valve is connected both downstream and upstream of the control valve with the inlet duct of the combustion engine through a pressure duct network including means acting upon the size of the passage of the ducts in dependence on the load of the combustion engine occurring during operation.

47 Claims, 3 Drawing Figures

COMBUSTION ENGINE COMPRISING A VAPORIZER PRESSURE REGULATOR

BACKGROUND AND SUMMARY OF THE INVENTION

The present invention relates to a vaporizer-pressure regulator for a combustion engine.

The invention is applicable to a combustion engine having an inlet duct including a gas or control valve where the vaporizer-pressure regulator has a first space divided into two compartments by a diaphragm located in said space, said diaphragm being provided for controlling a first closing valve cooperating with a gas feed orifice of the first space, while that compartment of the space in which the gas feed orifice opens out is connected by a connecting duct through a second gas feed orifice with a second space also divided into two compartments with the aid of a diaphragm, said second diaphragm serving to actuate a second closing valve cooperating with the second gas orifice and the space in which the connecting duct opens out is connected through a second connecting duct with the inlet duct of the engine.

In combustion engines and in particular in car combustion engines the fuel used is often formed by pressure-liquified, gaseous hydrocarbons such as LPG. The fuel is stored in the liquid state in a tank under excess pressure. The feed of the engine requires this liquid fuel to be gasified, after which the gas with air admixture in the inlet duct of the engine is fed to the engine. For this purpose a vaporizer-pressure regulator is used in which the pressure of the fuel is reduced and the fuel is converted from the liquid phase into the gaseous phase. This usually occurs in two stages, in which the first stage the fuel emanating from the tank is admitted in a first space through a gas feed orifice that can be opened and closed to a greater or lesser extent with the aid of a first closing valve, which valve is acted upon by a spring-loaded diaphragm arranged in the space.

The pressure in the tank may vary between 3 and 5 bars and in the first stage the pressure may be reduced to 0.5 bar. On the one hand there is a tendency to maximize the pressure reduction in the first stage in order to optimize the conversion of the fuel into the gaseous state, whereas on the other hand the pressure in the first stage must not become too low in order not to adversely affect the maximum capacity of the vaporizer-pressure regulator.

In the second stage the pressure is further reduced, to which end the gas is supplied from the aforesaid first space to a second space, the gas feed to said second space being usually controlled also with the aid of a closing valve actuated by a diaphragm.

According to the invention that compartment of the first space which is located on the side of the diaphragm controlling the first closing valve remote from said first closing valve is connected with the inlet duct of the combustion engine both downstream and upstream of the gas valve through ducts which include means capable of affecting the size of the passage of the ducts in dependence on the load of the combustion engine occurring during operation.

By using the construction embodying the invention, the position of the first closing valve can also be influenced in dependence on the pressure prevailing in the inlet duct of the combustion engine downstream and/or upstream of the gas valve in accordance with the load and the number of revolutions of the combustion engine. In practice it has been found that in this way an appreciable improvement in the operation of the combustion engine can be obtained.

BRIEF DESCRIPTION OF THE DRAWINGS

The invention will be described more fully hereinafter with reference to a few embodiments of a vaporizer-pressure regulator connected with the inlet duct of a combustion engine in accordance with the invention schematically illustrated in the accompanying drawings.

DETAILED DESCRIPTION

Figure 1:
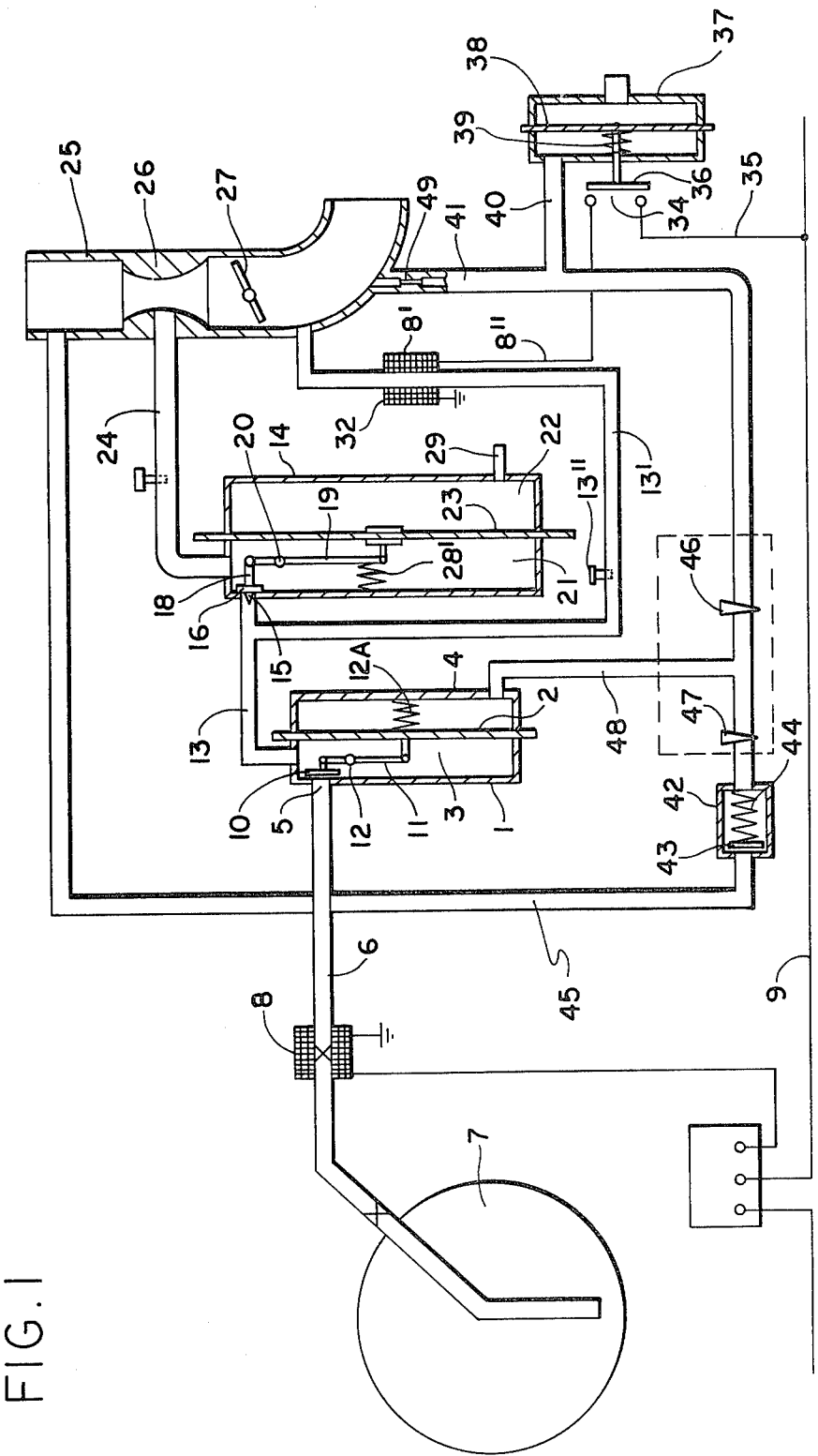
FIG. 1 schematically shows a first embodiment of a vaporizer-pressure regulator in accordance with the invention.

Referring to FIG. 1, the vaporizer-pressure regulator comprises a first housing bounding a space divided into two parts 3 and 4 by a diaphragm 2 arranged in said housing. On one side of the diaphragm the housing 1 has a gas feed orifice 5, which communicates through a feeding duct 6 with a fuel tank 7.

In the feeding duct 6 is arranged in a conventional manner an electrically operating shutter 8 included in the ignition circuit of the engine on which the vaporizer-pressure regulator is arranged in a manner such that shutter 8 only opens when the ignition circuit 9 is energized.

The housing 1 furthermore comprises a valve 10 fastened to the end of a lever 11, which is adapted to turn about a pivotal shaft 12 located between the ends of the lever and fixedly arranged in the housing 1. The end of the lever 11 remote from the first closing valve 10 is pivotally coupled with the diaphragm 2. From the figure it will furthermore be apparent that the diaphragm 2 is loaded by a spring 12a enclosed between a wall of the housing 1 and the diaphragm 2.

The part 3 of the space bounded by the housing 1, in which the duct 6 opens out, communicates through a connecting duct 13 with a second housing 14 through a second gas feed orifice 15, the passage of which can be varied with the aid of a second closing valve 16 located in the housing 14. A spring 28' arranged between the diaphragm 23 and a wall of the housing tends to urge the valve into a position in which the passage 15 is shut off.

To the closing valve 16 is fastened a valve stem 18, which is coupled with one end of a lever 19. Between its ends the lever is coupled with the housing 14 with the aid of a pivotal shaft 20, whereas the other end of the lever 19 remote from the valve stem 18 is connected with a diaphragm 23, dividing the inner space of the housing 14 into two parts 21 and 22.

Although the housings 3 and 14 are shown in the schematic drawing in the form of more or less separate housings, it will be obvious that these chambers and the spaces formed by said chambers may be arranged in an integral assembly, in which the various ducts or parts of these ducts may be formed by bores or the like provided in said assembly.

The part 21, in which the second gas feed orifice 15 opens out, furthermore communicates through a feeding duct 24 with the inlet duct 25 of a combustion engine (not shown in detail), that is to say, at the area of the venturi 26 usually provided in such an inlet duct and arranged in the inlet duct 25 upstream of the usually employed gas valve 27.

From the figure it will furthermore be apparent that a compression spring 28 is provided to cooperate with the second shut-off valve 16, said spring tending to urge the valve 16 into the closed position.

The part 22 of the space bounded by the chamber 14 located on the side of the diaphragm remote from the second shut-off valve 18 is in open communication through a passage 29 with the atmosphere.

The duct 13 communicates through a duct 13' with a spot of the inlet duct 25 located downstream of the gas valve.

Preferably the passage of the duct 13' is controllable with the aid of a manually adjustable valve 13" included in the duct. Furthermore the duct 13' includes an electrically actuable shutter 8', which is connected by a current conveying wire 8" to a switch 34. The switch 34 is connected through a wire 35 to the ignition circuit of the engine. The two contact points to which the wires 8" and 35 are connected may be interconnected with the aid of a switching tongue 36, which is connected with a diaphragm 38 arranged in the housing 37 and cooperating with a spring 39 which tends to urge the diaphragm 38 and the switching tongue 36 connected herewith to the right as viewed in FIG. 1, that is to say, into a position in which the two leads 8" and 35 are not connected to one another. On one side of the diaphragm 38 the housing 37 communicates through a connecting duct 40 with a duct 41, one end of which is connected downstream of the gas valve 27 with the inlet duct 25 of the engine. The other end of the duct 41 is connected with a valve housing 42, in which is arranged a valve 43 which is urged by a spring 44 into a position in which the valve 43 shuts off the opening of a duct 45 connected with the valve housing, the end of said duct 45 remote from the valve housing 42 being connected with the inlet duct 25 upstream of the venturi 26 and the gas valve 27.

The duct 41 furthermore includes two control-members 46 and 47, for example, control needles, with the aid of which the size of the passage of the duct 41 can be adjusted at the location of said control-members 46 and 47. Between these two control-members the duct 41 has connected with it one end of a duct 48, the other end of which is connected with the part 4 of the space bounded by the housing 1, said part 4 being located on the side of the diaphragm 2 remote from the valve 10.

The constructions described above operates as follows.

When the engine is standing still, the pressure in part 4 of the housing 1 and in the duct 41 will be equal to atmospheric pressure.

The electric circuit is preferably designed so that when the engine is started the electric shutter is only opened when a relay actuating said shutter 8 is energized by voltage pulses of the ignition.

When the shutter 8 is opened, the fuel will flow through the duct 6 to the housing 1, where the pressure is reduced in a first stage. Since atmospheric pressure is prevailing in the part 4 located on the side of the diaphragm 2 remote from the valve 10 opening in the direction of flow of the fuel, the valve 10 will open relatively easily so that an optimal supply of fuel to the first stage and from the first stage to the second stage is obtained.

At the start subatmospheric pressure is obtained in the inlet duct, said subatmospheric pressure propagating through ducts 40, 41 to the left-hand chamber of the housing 37. This subatmospheric pressure is slight, it is true, but the diaphragm 38 and the spring 39 are designed so that under the action of this slight subatmospheric pressure the diaphragm moves the switching tongue 36 to the left, as viewed in the figure, so that the two ducts 8" and 35 are connected with one another and the coil of the shutter 8' is energized. Owing to the energization of the shutter 8' it is opened and retained in a position such that the passage of the duct 13' is opened to pass the gas required for the engine start, while the duct 13' remains open as long as the engine is running, that is to say, as long as the shutter 8' remains energized so that at any time a flow of fuel to the engine is ensured without the need for taking further steps to guarantee the fuel supply to the engine beyond the second closing valve 16.

The design of the means reducing the fuel pressure in the first stage formed by the diaphragm 2, the valve 10, the lever 11 and the spring 12a is such that at the start the desired composition of the fuel-air mixture supplied to the engine is obtained without the need for providing additional expedients for obtaining a sufficiently rich mixture.

When after the start the engine is running stationarily, the vacuum in the inlet duct 25 downstream of the gas valve 27 will have a relatively high value, while also the pressure in the part 4 of the space bounded by the housing 1 will decrease. Owing to the decreasing pressure in the part 4 of the space bounded by housing 1, the diaphragm 2 tends to move to the right, as viewed in the figure, thus slightly closing the valve 10, so that the supply of fuel is diminished and the pressure of the fuel supplied through the inlet duct 13 to the second chamber 14 will be relatively low so that in the stationary operation the valve 16 will be closed.

However, since the duct 13' constitutes an open communication between the duct 13 and the duct 25 downstream of the gas valve 27 the gas formed will, under these conditions, be supplied to the engine in an accurately defined dosis at the desired low supply pressure.

When the gas valve 27 is opened or further opened, for example, when the load and/or the number of revolutions are raised, the value of the subatmospheric pressure downstream of the gas valve will initially decrease. As a result the value of the subatmospheric pressure in the part 4 of the space bounded by housing 1 will decrease so that the diaphragm 2 tends to move to the left, as viewed in the figure and thus to further open the valve 10, the pressure of the fuel passing from the first stage of the pressure regulator via the inlet duct 13 to the second stage of the pressure regulator and the quantity of fuel thus increasing.

Immediately thereafter the value of the subatmospheric pressure at the location of the venturi, that is to say, at the location of the junction between the connecting duct 24 and the inlet duct 25, will increase. This results in that the value of the subatmospheric pressure in the part 21 of the space bounded by the housing 14 increases so that the diaphragm 23 will mve to the left and hence the valve 16 will be readily opened also owing to the rising pressure in the duct 13.

When the load conditions of the engine set with the aid of the gas valve 27 have stabilized, the value of the subatmospheric pressure in the inlet duct downstream of the gas valve will increase and hence also the value of the subatmospheric pressure in the part 4 of the space bounded by the housing 1 will again increase, as a result of which the diaphragm 2 again tends to move to the right, as viewed in figure and to urge the valve 10 further into the closed position, the fuel-air mixture fed to the engine thus becoming leaner as desired in the situation.

When the combustion engine is mounted in a motor-car and when the car is braked by the engine by releasing the gas pedal, the gas valve 27 being thus closed, a very high subatmospheric pressure will be formed in the inlet duct 25 downstream of the gas valve 27, which subatmospheric pressure will, of course, propagate to the part 4 of the space bounded by the housing 1. As a result the valve will be urged into the closed position by the right-hand movement of the diaphragm 2 so that the gas supply in the combustion engine is interrupted, which results in a very appreciable saving of fuel.

It will be obvious that by using the construction embodying the invention the gas supply constantly adapts itself to the operational conditions of the combustion engine, while it can be ensured that up to the maximum load the fuel pressure from the first stage as low as possible, so that the supply of dry gas to the engine can be practically guaranteed, which dry gas can mix in the desired manner with the air sucked into the inlet system of the engine so that the engine can operate with optimum efficiency. Fluctuations of the engine load are in the first place corrected by variation of the pressure of the gas supplied from the first stage to the second stage and the regulation of the engine is less dependent on the function of the second stage.

When the vaporizer-pressure regulator embodying the invention is used, the venturi 26 in the inlet duct can be made sufficiently large without objection to ensure that at a maximum load of the engine the cylinder filling is at the optimum, while the design of the pressure regulator is such that at a maximum load and number of revolutions of the engine the valve 16 of the second stage of the pressure regulator is fully opened under the action of the subatmospheric pressure obtained in the part 21 of the space bounded by the housing 14. The shape of the valve 16 can be adapted to the engine on which the pressure regulator is used for ensuring optimal iuel supply to the engine.

In order to obtain optimal controllability control-members 46 and 47 are provided. By varying to a greater or lesser extend the passage of the duct 41 at the area of said control-members by means of these members the value of the subatmospheric pressure obtained in the part 4 of the space bounded by the housing 1 can be varied to adapt the vaporizer-pressure regulator to the type of the engine on which the vaporizer-pressure regulator has to be employed.

If desired means may be provided with the aid of which said control-members 46 and 47 are set during operation in dependence on, for example, the prevailing temperature, the pressure of the ambient air, the humidity of the air and so on.

The non-return valve 43 arranged between the ducts 41 and 45 prevents gas from flowing through the duct 45 to the air filter mounted on the inlet duct in the event of leakage of the diaphragm 2.

It will furthermore be apparent from the figure that in the duct 41 a calibrated passage 49 is provided between the inlet duct 25 and the housing 37. It is thus ensured that in the case of leakage of the diaphragm 2 the escaping gas will sufficiently raise the pressure in the chamber 37 on the right-hand side of the diaphragm 38 to open the switch 34 so that the coil 32 is no longer energized. Furthermore, due to the resultant excessively rich fuel mixture fed to the engine the engine will cut out, while due to the disappearance of the subatmospheric pressure in the duct 24 the diaphragm 23 is urged to the right by the spring 28' and hence the valve 16 is pushed into its closed position. Since in this case no voltage pulses are any longer emitted by the ignition for maintaining the shutter 8 in the open position, the main shutter 8 will also be closed.

From the foregoing it will be obvious that by means of the vaporizer-pressure regulator embodying the invention a highly effective construction is obtained by which under all operational conditions of the combustion engine provided with the vaporizer-pressure regulator an optimal gas supply to the engine can be ensured while in addition severe safety requirements are satisfied to avoid undesirable escape of gas.

Figure 2:
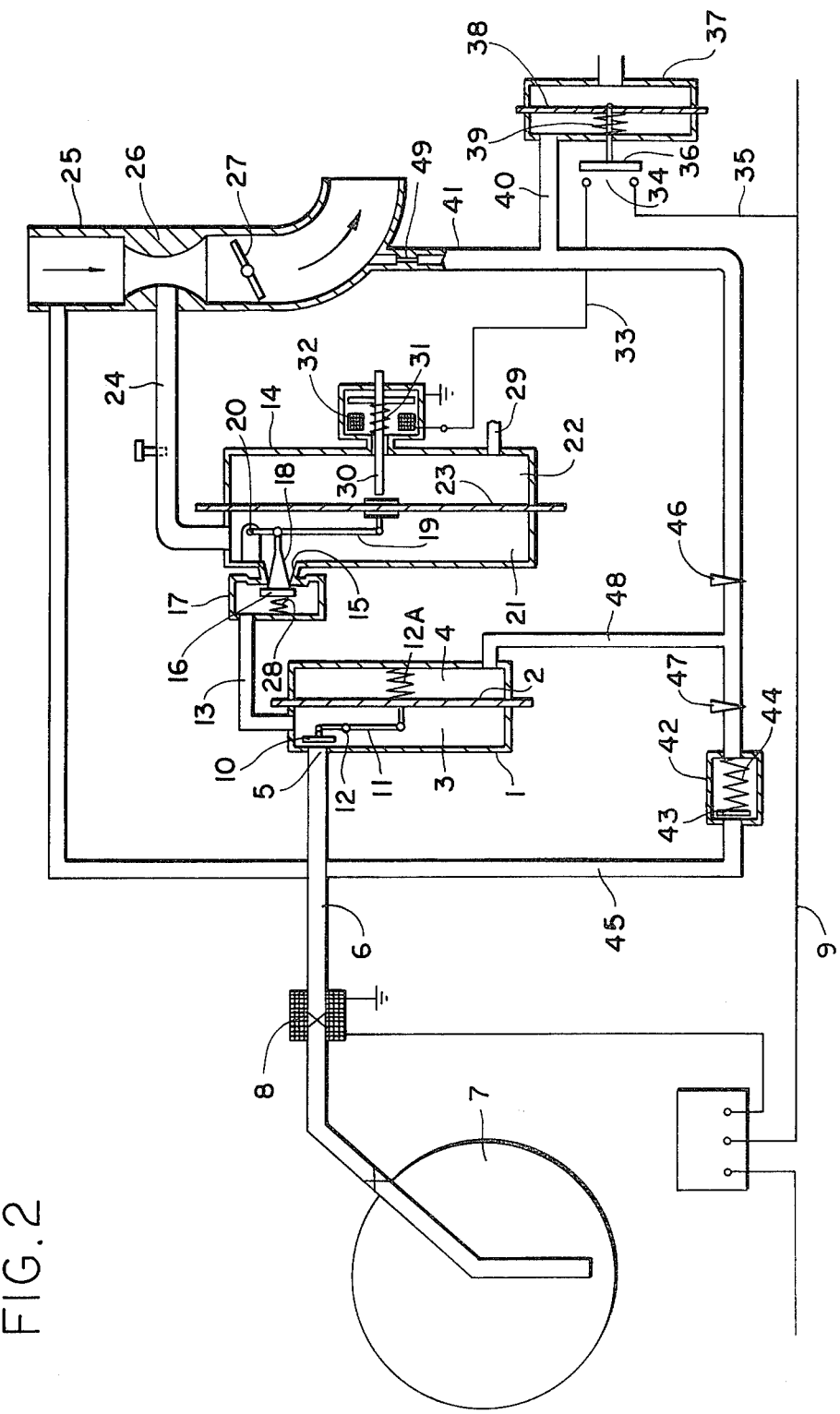
FIG. 2 shows schematically a second embodiment of a vaporizer-pressure regulator in accordance with the invention.

The embodiment shown in FIG. 2 corresponds at least substantially with the embodiment of FIG. 1 and identical parts have the same reference numerals in the two figures.

In the embodiment of FIG. 2 the valve dish of the second shut-off valve is arranged in a front chamber 17 of the second chamber 14, while a valve stem 18 passed through the passage 15 is coupled with the lever 19 at a point located between the two ends of the lever. One end of the lever 9 is coupled with the aid of a pivotal shaft 20 with the housing 14, whereas the other end of the lever 19 is connected with the diaphragm 23. The part 22 of the space bounded by the housing 14 holds furthermore the end of a pin 30, which is arranged so as to be slideable perpendicularly to the surface of the diaphragm 23. A spring 31 surrounding the pin 30 tends to shift the pin to the right, as viewed in the figure.

Around the pin 30 is arranged a coil 32, which is connected through a lead 33 to the switch 34. The shunt lead 13' is omitted here.

The mode of operation of the embodiment shown in FIG. 2 is at least substantially identical to that of the embodiment of FIG. 1.

However, since the second valve 16 opens herein against the direction of flow of the fuel, the fuel flowing to the front chamber 17 tends to urge the valve 16 against its seat so that the supply passage 15 to the housing 14, in which the fuel pressure is reduced in a second stage, is blocked.

Owing to the subatmospheric pressure produced in the housing 37 at the start, however, the switch 34 will be closed and the coil 32 will be energized.

As a result of the energization of the coil 32 the pin 30 is moved to the left as viewed in the figure and retained in a position such that the pin 30 can displace the valve 16 via the diaphragm 23 and the lever 19 to an extent such that the passage 15 is slightly open as long as the engine is running, that is to say, as long as the coil 32 is energized and can no longer be fully closed so that at any time fuel supply to the engine is ensured without the need for additional steps to ensure fuel supply to the engine beyond the second shut-off valve 16.

If in the event of a very heavy load of the engine the subatmospheric pressure in the inlet has such a low value that by the action of the spring tension 39 the switching tongue 36 moves to the left and hence the energization of the coil 32 drops out, so that the pin 30 forming a stop for the diaphragm 23 moves again to the right, as viewed in the figure, yet a sufficient subatmospheric pressure will be obtained in the part 21 of the space bounded by the housing 14 owing to the high velocity of the air stream in the venturi 26 for the valve 16 to remain open.

Figure 3:
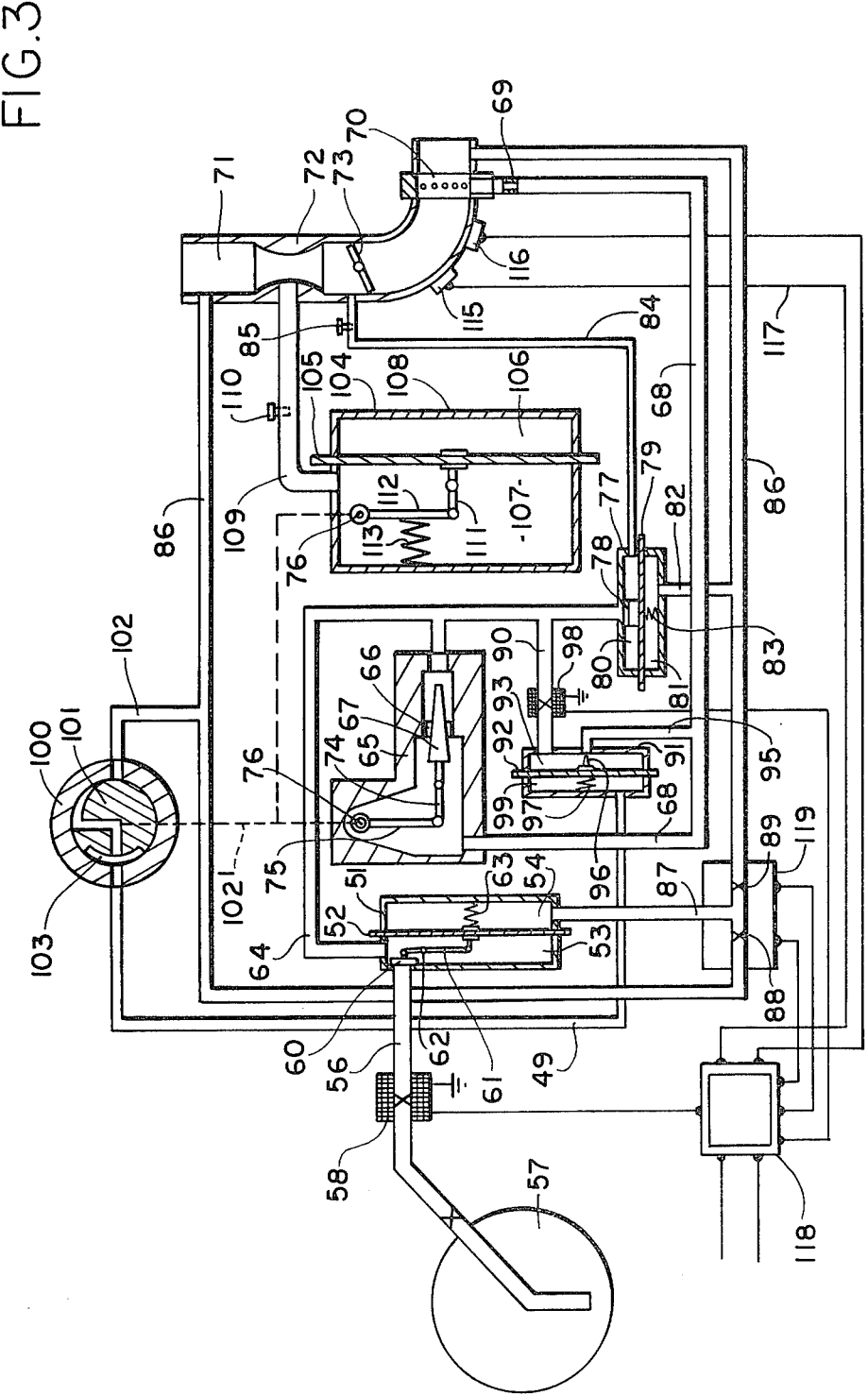
FIG. 3 schematically shows a third embodiment of a vaporizer-pressure regulator in accordance with the invention.

The vaporizer-pressure regulator shown in FIG. 3 comprises a first housing 51, which bounds a space divided by a diaphragm 52 arranged in said housing into two parts 53 and 54. On one side of the diaphragm the housing 51 has a gas supply orifice 55 which communicates through an inlet duct 56 with a fuel tank 57. The inlet duct 56 included in a conventional manner an electrically operating shutter 58, which is included in the ignition circuit of the combustion engine on which the vaporizer-pressure regulator is arranged so that this shutter is only opened when the ignition circuit is energized.

The housing 51 furthermore comprises a valve 60 fastened to the end of a lever 61, which is adapted to turn about a pivotal shaft 62 located between the ends of the lever and rigidly secured in the housing 51. The end of the lever 61 remote from the first shut-off valve 60 is pivotally coupled with the diaphragm 52. From the figure it will furthermore be apparent that the diaphragm 52 is subjected to the action of a compression spring 63 locked in between a wall of the housing 51 and the diaphragm.

The part 53 of the space bounded by the housing 51, in which the duct 56 opens out, communicates through a connecting duct 64 with a housing 65 on one side of a passage bounded by a valve seat 66, the size of which passage can be controlled by a control-needle 67 located in said passage. On one side of the passage bounded by the valve seat 66 remote from the junction of the duct 64 a duct 68 is connected with the housing 65 said duct communicating through a calibrated passage 69 with a gas supply member 70, which is included in an inlet duct 71 of a combustion engine that is to say downstream of the conventional venturi 72 in said inlet duct and of the gas valve 73.

The needle valve 67 is connected with the aid of a coupling rod 74 with an arm 75, which is fastened to a shaft 76 journalled in the housing 65.

The duct 64 is furthermore connected with a housing 77 through a passage in the wall of the housing 77 that can be closed by a shut-off valve 78. The shut-off valve 78 is fastened to a diaphragm 79 arranged in the housing and dividing the housing into a first space 80 with which the duct 64 communicates and a second space 81 with which communicates a duct 82. A spring 83 arranged in the housing 77 and cooperating with the diaphragm 79 tends to urge the shut-off valve 78 into a position in which the supply from the duct 64 is cut off.

With the space 80 of the housing a further duct 84 is connected at the side of the duct 64, said duct 84 being connected with the inlet duct 71 between the venturi 72 and the gas valve 73. In the duct 84 is arranged a control member 85 with the aid of which the size of the passage of the duct 84 at the location of said control member can be varied.

The duct 82 is conected with a duct 86, one end of which is connected downstream of the venturi 72 and the gas valve 73 with the inlet duct 71, whereas the other end is connected with the inlet duct upstream of the venturi. With said duct 86 is furthermore connected a duct 87, which connects the duct 86 with the space 54 of the housing 51. On both sides of the mouth of the duct 87 in the duct 86 the duct 86 has control members 88 and 89, with the aid of which the size of the passage of the duct 86 at the location of said control members can be varied.

The duct 64 furthermore communicates through a duct 90 with a housing 91, which is divided by a diaphragm 92 into two chambers 93 and 94. With the chamber 93, in which opens out the duct 90, is connected a duct 95, which connects the chamber 93 with a duct 68. The opening of the duct 95 in the housing 91 can be closed by a needle 96, which is fastened to the diaphragm 92. A compression spring 97 arranged in the chamber 94 and cooperating with the diaphragm 92 tends to urge the needle 96 into a position in which said needle closes the duct 95.

The duct 90 furthermore includes an electrically or electronically operable shutter 98.

With the chamber 99 of the housing 91 communicates the end of a duct 49, the other end of which communicates with a housing 100, in which a control plunger 101 is rotatably journalled. As is schematically indicated in the figure by a broken line 102′, the plunger 101 is rigidly secured to the shaft 76. Apart from the duct 49 one end of a duct 102 is connected with the housing 100, the other end of said duct being connected with the duct 86. The plunger 101 has furthermore a control passage 103, the arrangement being such that in the position of the control plunger 101 shown in the figure the communication between the ducts 49 and 102 is cut off by the plunger, whereas when the plunger is turned to the right, the size of the flow passage from the duct 49 through the plunger 101 to the duct 102 gradually increases.

The system comprises a further housing 104, which is also divided by a diaphragm 105 into two chambers 106 and 107. The chamber 106 is in open communication with the atmosphere through a passage 108 in the wall of the housing. The chamber 107 is connected through a duct 109 with the inlet duct 71 at the location of the narrowest passage of the venturi 72. The duct 109 includes a control-member 110, with the aid of which the size of the passage of the duct 100 can be varied. The diaphragm 105 is connected with the aid of a coupling rod 111 with an arm 112, which is fastened to the shaft 76. A compression spring 113 arranged between the arm 112 and a wall of the housing 108 tends to turn the arm 112 and the shaft 76 fastened thereto in anti-clockwise direction as viewed in the figure.

It will be obvious that the housings described above may be arranged in a single member and the ducts interconnecting the various housings may be formed by bores or the like. The disposition will be such that the shaft 76 carrying the arms 75 and 112 is in line with the plunger 101, with which it is rigidly secured.

The inlet duct is furthermore provided with two pressure switches 115 and 116, which are connected through electric leads 117 and 117′ respectively to an electronic control unit 118, which is connected both to the shutter 58 and to a control member 119 for actuating the means 88 and 89 by which the passage of the duct 86 can be varied on both sides of the junction of the duct 87 with the duct 86 and with the shutter 98.

The mode of operation of the vaporizer pressure regulator described above mounted on a combustion engine is as follows.

When the engine is standing still, the pressure in the space 54 of the housing 51 will be at least substantially equal to atmospheric pressure.

As stated above, the electric circuit of the combustion engine is preferably designed so that only at the start of the engine the shutter 58 is opened with the aid of a relay which is energized by voltage pulses from the ignition.

When the shutter 58 is opened, the fuel will flow via the duct 56 to the housing 51, in which the pressure is lowered in a first stage. Since atmospheric pressure prevails in the space 54, the valve 60 can be readily opened by the gas subjected to a relatively high pressure and coming in through the duct 56 so that a relatively high amount of gas can flow into the space 53. This could result in an excess amount of fuel in the mixture to be supplied to the combustion engine. In order to avoid this the subatmospheric pressure switch 115 is provided. In accordance with the type of engine this switch 115 is set so that by this switch 115 and the control unit 118 the duct 86 is closed at the location of the control member 88 as long as the subatmospheric pressure in the inlet duct 71 at the location of the switch 115 has not yet dropped below a given value. Therefore, during the start the control member 88 will hold the duct 86 in the closed state and the slight subatmospheric pressure produced in the inlet duct during the start can produce a subatmospheric pressure in the part 54 of the housing 51 through the ducts 86 and 87. Owing to the subatmospheric pressure in the space 54 of the housing 51 the spring 63 is exposed to a counterforce so that the valve 60 will open less readily and hence during the start a correct composition of fuel and air can be obtained.

During the start a subatmospheric pressure will be obtained through the ducts 86 and 82 in the space 81 of the housing 77 as a result of which the valve 78 is opened. Thus the gas, the pressure of which is lowered in the housing 51, can flow through the duct 64 in the housing 77 and the duct 84 into the inlet duct 71 of the engine downstream of the venturi 72 and upstream of the gas valve 73.

When after the start the engine is running stationarily, the value of the subatmospheric pressure in the inlet duct 71 downstream of the gas valve 73 will be relatively high. This results in a displacement of the switch 114 so that through the control unit 118 and the control member 119 the shut-off member 88 is opened to a given extent. Consequently the duct 86 gets into communication with the inlet duct at a point upstream of the venturi 72 so that the occurrence of excessive subatmospheric pressure in the duct 86 and hence in the space 54 of the housing 51 is avoided. An excessive subatmospheric pressure in the space 54 of the housing 51 might prevent the valve 60 from opening for supplying the gas.

By a correct setting of the passages of the duct 86 determined by the control members 88 and 89 it can now be ensured that at the lowest possible gas pressure a fuel-air mixture of the correct composition is supplied to the engine to guarantee a quiet stationary run of the engine.

When the load and/or the number of revolutions of the engine are raised, the gas valve 73 is further opened so that the value of the subatmospheric pressure at the location of the venturi, that is to say, at the location of the junction of the duct 109 will increase. Consequently, the subatmospheric pressure in the space 107 of the housing 104 will increase which results in a displacement of the diaphragm 105 to the left, as viewed in the figure. Owing to this displacement of the diaphragm 105 the shaft 76 will be turned through the lever 112 in clockwise direction, as viewed in the figure. Owing to this turn of the shaft 76 the needle valve 67 is lifted from its seat 66 so that from the duct 64 through the housing 65 gas can flow to the engine via the duct 68.

Upon further opening of the gas valve as mentioned above the value of the subatmospheric pressure downstream of the gas valve 73 and hence in the part 54 of the housing 51 will decrease so that the diaphragm 52 tends to move to the left, as viewed in the figure to further open the valve 60, which results in that the pressure of the fuel supplied from the first stage of the pressure regulator formed by the housing 51 in the duct 64 will increase. Owing to this increase in pressure the amount of fuel supplied through the housing 80 and the duct 84 to the engine will increase. This fuel pressure increase in the duct 64 furthermore contributes to lifting the needle valve 67 from its seat 66.

When after the gas valve 73 has been turned into a given position stabilization of the number of revolutions and of the load condition of the engine is obtained, the value of the subatmospheric pressure in the inlet duct downstream of the gas valve will again increase. This also results in an increase in the value of the subatmospheric pressure in the part 54 of the housing 51 of the first stage of the vaporizer pressure regulator so that the diaphragm 52 again tends to move slightly to the right, as viewed in the FIG. 3. Thus, the valve 60 is again urged towards its closed position, which results in a desired decrease in the gas supply and hence in a depletion of the fuel-air mixture supplied to the engine.

Assuming the combustion engine is mounted in a motorcar, the engine can be used to brake the car by releasing the gas pedal and by the resultant closure of the gas valve 73. As a result a very high subatmospheric pressure will be produced in the inlet duct 71 downstream of the gas valve 73. In this way the subatmospheric pressure switch 115 is displaced so that by means of this switch 115 the duct 86 is blocked at the location of the control member 88 through the control unit 118 and the control member 119. As a result the high subatmospheric pressure produced in the inlet duct is also produced in the space 54 of the housing 51 so that the inlet duct is also produced in the space 54 of the housing 51 so that the diaphragm 52 tends strongly to move as far as possible to the right, as viewed in the figure and to urge the valve 60 into its closed position. Therefore, during braking by the engine practically no fuel will be supplied to the engine, which favorably affects the fuel consumption.

By using the above-described construction embodying the invention the fuel supply to the engine will always most favorably match the operational conditions of the engine, while it can be ensured that up to maximum load the pressure of the fuel emanating from the first stage of the vaporizer pressure regulator is as low as possible so that at least substantially constantly dry gas is supplied to the engine, which means that the gas is completely vaporized before it is introduced into the inlet duct. Consequently this dry gas can effectively mix with the air sucked into the inlet duct, which promotes an optimal combustion of the gas.

Since the gas supply is determined to a considerable extent in dependence on the subatmospheric pressure in the inlet duct downstream of the gas valve 73, the venturi 72 in the inlet duct may unobjectionally have a sufficiently large passage to ensure that the cylinder filling remains optimal at a maximum load of the engine. The design is such that at a maximum load and number of revolutions the gas supply pressure and the overall surface or the passage 69 in the duct 68 and the passage of the duct 84 defined by the control member 85 are determinative of the amount of fuel supplied. Of course, this is also related to the design of the control needle 67, which can be constructed so that at any normally occurring load and number of revolutions an optimal proportion of fuel to air in the mixture for the engine concerned can be obtained.

Since no gas is supplied to the housing 104, in which is arranged the diaphragm 105 actuating the control needle 67, the position of the diaphragm 105 will not be varied by pressure fluctuations of the gas, while fouling of this diaphragm by the effect of aggressive substances in the gas is avoided so that accurate regulation of the needle 67 with the aid of the diaphragm 105 can always be ensured.

At a uniform increase in engine load a correct adaptation of the fuel-air proportion can always be obtained when using the construction described above. However, at a very drastic increase in load and undesirable depletion of the fuel mixture might occur for a very short period. In order to avoid this the chamber 91 with its components and the adjustable plunger 101 are included in the system.

Gas can be supplied to the chamber 91 through the electronically actuated shutter 98 only when the shutter is opened through the control unit 118. This opening will occur only when the shutter is opened through the control unit 118. This opening will occur only when the engine is running with the normal idle number of revolutions. When the shutter 98 is opened, gas will be supplied from the duct 64 to the space 93 in the housing 91. By the action of this gas pressure the diaphragm 92 and the valve 96 coupled herewith tend to move to the left, as viewed in the figure, which is avoided by the spring 97 until a given excess pressure occurs. When the bias tension of the spring 97 is overcome, the valve 96 is lifted from its seat and gas can flow through the duct 95 and the calibrated passage 69 and the supply member 70 into the inlet duct. According as the gas pressure in the duct 64 increases, the needle 96 will be urged further away from its seat so that more gas will be supplied through the duct 68. In this case, however, air must be able to escape from the space 99 of the housing 91. This space 99 communicates through the duct 49 with the housing 100 comprising the control plunger 101. This structure is chosen in order to avoid excessive enriching of the mixture at an abrupt increase in load from a relatively low number of revolutions.

When the air rate in the inlet duct 71 of the engine is still low, the angular turn of the shaft 76 produced with the aid of the diaphragm 105 and hence the annular turn of the plunger 101 will still be slight, so that the size of the passage in the housing 100 released by the plunger from the duct 99 to the duct 102 is still only small. Consequently the air can escape only with difficulty from the space 94 of the housing 91 so that fast opening of the valve 96 and hence additional gas supply through the duct 95 are counteracted.

According as the air rate in the inlet duct increases, the diaphragm 105 and hence the shaft 76 with the plunger 101 will be further displaced so that an increasing portion of the passage to allow air to escape from the space 94 is released, resulting in further enrichment of the fuel-air mixture.

The figures used in the claims are only meant to explain more clearly the intention of the invention and are not supposed to be any restriction concerning the interpretation of the invention.

What is claimed is:

1. A vaporizer-pressure regulator apparatus for a combustion engine with an electrical ignition circuit comprising an inlet duct having a venturi and a control-valve mounted therein downstream of the venturi, the vaporizer-pressure regulator comprising a first housing with a first space, a first diaphragm for dividing the first space into a first part and a second part, a fuel supply duct opening into the first part to define a fuel supply orifice, a first shut-off valve in the first part, the first diaphragm being provided for actuating the first shut-off valve to variably open the fuel supply orifice, a fuel duct network coupling the first part of the first space to the inlet duct, a fuel flow affecting member for effecting the fuel flow in the fuel duct network comprising a second housing defining a second space, the second space communicating with the inlet duct, a pressure duct network connecting the second part of the first space to the inlet duct both downstream and upstream of the control valve in the inlet duct, the pressure duct network comprising a passageway region with a sized opening therethrough, and opening control means for varying the size of opening through the passageway region of the pressure duct network in dependence on the load of the combustion engine occurring during operation.

2. The apparatus of claim 1 wherein the pressure duct network comprises a shunt duct with a passageway therethrough, the shunt duct coupled between a point of the inlet duct located downstream of the control valve and a point of the inlet duct located upstream of the venturi, and the opening control means comprises a pair of control members arranged in the shunt duct for adjusting the size of the passageway through the shunt duct, the second part of the first space being connected with the shunt duct at a point located between the two control members.

3. The apparatus of claim 2 further comprising a non-return valve in the shunt duct between the point where the shunt duct is connected with the first space and the point where the shunt duct is connected with the inlet duct upstream of the control valve the non-return valve preventing pressurized gas from flowing through the shunt duct towards the junction of the shunt duct with the inlet duct located upstream of the venturi.

4. The apparatus of claim 1 further comprising a first connecting duct in the fuel duct network for connecting the first part of the first space and the second space of the fuel flow affecting member.

5. The apparatus of claim 1 wherein fuel duct network comprises a second connecting duct for connecting the first part of the first space with the inlet duct at a location downstream of the control valve.

6. The apparatus of claim 5 further comprising an electrically actuable shutter in the second connecting duct, a third housing having therein a chamber communicating with the shunt duct, a second diaphragm in the chamber, and a switch actuably connected to the second diaphragm so that at the occurrence of vacuum in the chamber the switch is closed and the shutter is opened.

7. The apparatus of claim 4 further comprising a second shut off valve between the first connecting duct and the second space, a stop in the second space, a coil connected to the electrical ignition circuit so that when the coil is energized the stop limits the shutting motion of the second shut-off valve.

8. The apparatus of claim 7 further comprising a switch actuably connected to the second diaphragm, the second diaphragm actuating the switch to actuate the adjustable stop by energizing the coil whereby when the chamber is exhausted, the switch is closed.

9. The apparatus of claim 6 further comprising a restriction means in the shunt duct between the junction of the shunt duct and the inlet duct located downstream of the control valve and the junction between the chamber having the second diaphragm and the shunt duct.

10. The apparatus of claim 1 further comprising at least one subatmospheric pressure switch connected with the inlet duct downstream of the control-valve and coupled for controlling the opening control means to affect the size of the passageway through the pressure duct network.

11. The apparatus of claim 10 characterized in that one of the subatmospheric pressure switches is provided to establish, through said control means, communication with the part of the inlet duct located upstream of the control valve only after the engine is running in the idle mode after the start.

12. The apparatus of claim 10 further comprising another subatmospheric pressure switch connected in the inlet duct downstream of the control-valve so that when a predefined subatmospheric pressure in the inlet duct is exceeded, the connection with the part of the inlet duct located upstream of the control-valve through the pressure duct network is substantially blocked.

13. The apparatus of claim 1 further comprising a fourth housing having therein a third space, a third diaphragm bifurcating the third space into a third part and a fourth part the pressure duct network connecting the second part of the first space with the part of the inlet duct located downstream of the control valve and further connected to the fourth part of the third space, the third part of the third space being connected to the fourth part of the fuel duct network connecting the first part of the first space with the inlet duct, and a third shutoff valve connected with the third diaphragm for regulating the flow through the fourth part of the fourth housing.

14. The apparatus of claim 10 further comprising a fourth housing having therein a third space, a third diaphragm bifurcating the third space into a third part and a fourth part the pressure duct network connecting the second part of the first space with the part of the inlet duct located downstream of the control valve and further connected to the fourth part of the third space, the third part of the third space being connected to the fourth part of the fuel duct network connecting the first part of the first space with the inlet duct, and a third shutoff valve connected with the third diaphragm for regulating the flow through the fourth part of the fourth housing.

15. The apparatus of claim 12 further comprising a fourth housing having therein a third space, a third diaphragm bifurcating the third space into a third part and a fourth part the pressure duct network connecting the second part of the first space with the part of the inlet duct located downstream of the control valve and further connected to the fourth part of the third space, the third part of the third space being connected to the fourth part of the fuel duct network connecting the first part of the first space with the inlet duct, and a third shutoff valve connected with the third diaphragm for regulating the flow through the fourth part of the fourth housing.

16. The apparatus of claim 1 further comprising a fifth housing defining an interior chamber having an intake orifice with a valve seat and a control-needle positioned in the interior chamber to cooperate with the valve seat, a fourth diaphragm in the second housing, said control-needle being moveable in an axial direction upon movement of the fourth diaphragm, said fourth diaphragm being loaded on one side by atmospheric pressure and on the other side by the pressure prevailing in the inlet duct in a manner such that an increase in subatmospheric pressure in the inlet duct causes the control-needle to be displaced in a direction away from its seat to allow flow from the first space through the fifth housing and into the part of the fuel duct network coupled with the inlet duct.

17. The apparatus of claim 10 further comprising a fifth housing defining an interior chamber having an intake orifice with a valve seat and a control-needle positioned in the interior chamber to cooperate with the valve seat, a fourth diaphragm in the second housing, said control-needle being moveable in an axial direction upon movement of the fourth diaphragm, said fourth diaphragm being loaded on one side by atmospheric pressure and on the other side by the pressure prevailing in the inlet duct in a manner such that an increase in subatmospheric pressure in the inlet duct causes the control-needle to be displaced in a direction away from its seat to allow flow from the first space through the fifth housing and into the part of the fuel duct network coupled with the inlet duct.

18. The apparatus of claim 12 further comprising a fifth housing defining an interior chamber having an intake orifice with a valve seat and a control-needle positioned in the interior chamber to cooperate with the valve seat, a fourth diaphragm in the second housing, said control-needle being moveable in an axial direction upon movement of the fourth diaphragm, said fourth diaphragm being loaded on one side by atmospheric pressure and on the other side by the pressure prevailing in the inlet duct in a manner such that an increase in subatmospheric pressure in the inlet duct causes the control-needle to be displaced in a direction away from its seat to allow flow from the first space through the fifth housing and into the part of the fuel duct network coupled with the inlet duct.

19. The apparatus of claim 13 further comprising a fifth housing defining an interior chamber having an intake orifice with a valve seat and a control-needle positioned in the interior chamber to cooperate with the valve seat, a fourth diaphragm in the second housing, said control-needle being moveable in an axial direction upon movement of the fourth diaphragm, said fourth diaphragm being loaded on one side by atmospheric pressure and on the other side by the pressure prevailing in the inlet duct in a manner such that an increase in subatmospheric pressure in the inlet duct causes the control-needle to be displaced in a direction away from its seat to allow flow from the first space through the fifth housing and into the part of the fuel duct network coupled with the inlet duct.

15

20. The apparatus of claim 14 further comprising a fifth housing defining an interior chamber having an intake orifice with a valve seat and a control-needle positioned in the interior chamber to cooperate with the valve seat, a fourth diaphragm in the second housing, said control-needle being moveable in an axial direction upon movement of the fourth diaphragm, said fourth diaphragm being loaded on one side by atmospheric pressure and on the other side by the pressure prevailing in the inlet duct in a manner such that an increase in subatmospheric pressure in the inlet duct causes the control-needle to be displaced in a direction away from its seat to allow flow from the first space through the fifth housing and into the part of the fuel duct network coupled with the inlet duct.

21. The apparatus of claim 15 further comprising a fifth housing defining an interior chamber having an intake orifice with a valve seat and a control-needle positioned in the interior chamber to co-operating with the valve seat, a fourth diaphragm in the second housing, said control-needle being moveable in an axial direction upon movement of the fourth diaphragm, said fourth diaphragm being loaded on one side by atmospheric pressure and on the other side by the pressure prevailing in the inlet duct in a manner such that an increase in subatmospheric pressure in the inlet duct causes the control-needle to be displaced in a direction away from its seat to allow flow from the first space through the fifth housing and into the part of the fuel duct network coupled with the inlet duct.

22. The apparatus of claim 1 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

23. The apparatus of claim 10 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

24. The apparatus of claim 12 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

25. The apparatus of claim 13 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

26. The apparatus of claim 14 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

27. The apparatus of claim 15 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

28. The apparatus of claim 16 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

29. The apparatus of claim 17 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

30. The apparatus of claim 18 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

31. The apparatus of claim 19 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

32. The apparatus of claim 20 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

33. The apparatus of claim 21 further comprising a sixth housing defining a fourth space, a fifth diaphragm bifurcating the fourth space into a fifth part having an input orifice and an output orifice and a sixth part, a third connecting duct in the fuel duct network for connecting the input orifice of the fifth part of the fourth space to the first part of the first space, a fourth connecting duct in the fuel duct network for connecting the output orifice of the fifth part to the inlet duct of the combustion engine, a flow control valve connected to the fifth diaphragm to control the flow through the output orifice, and a shut-off member in the third connecting duct which is opened after the start of the engine only after a normal number of revolutions of the engine running in the idle mode is reached.

34. The apparatus of claim 22 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

35. The apparatus of claim 23 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

36. The apparatus of claim 24 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

37. The apparatus of claim 25 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

38. The apparatus of claim 26 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

39. The apparatus of claim 27 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

40. The apparatus of claim 28 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

41. The apparatus of claim 29 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

42. The apparatus of claim 30 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

43. The apparatus of claim 31 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

44. The apparatus of claim 32 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being displaced in dependence on the subatmospheric pressure prevailing in the inlet duct in a manner such that the passage from the fifth to the sixth connecting ducts is enlarged as the subatmospheric pressure in the inlet duct increases.

45. The apparatus of claim 33 further comprising a control member coupled by a fifth connecting duct to the sixth part of the fourth space and further coupled by a sixth connecting duct to the inlet duct upstream of the control valve whereby the control member affects the passage from the fifth connecting duct to the sixth connecting duct, said control-member being 46. The apparatus of claim 1 wherein the combustion engine further includes a fuel tank, the apparatus further comprising a shut off member coupled between the fuel tank and the first part of the first housing for being opened under the action of current pulses emanating from the ignition circuit of the combustion engine.

47. The apparatus of claim 2 wherein the combustion engine further includes a fuel tank, the apparatus further comprising a shut off member coupled between the fuel tank and the first part of the first housing for being opened under the action of current pulses emanating from the ignition circuit of the combustion engine.

* * * * *